(12) United States Patent
Tabuchi et al.

(10) Patent No.: US 7,025,680 B2
(45) Date of Patent: Apr. 11, 2006

(54) TORQUE TRANSMISSION DEVICE HAVING TORQUE LIMITER

(75) Inventors: Yasuo Tabuchi, Toyoake (JP); Naoto Agata, Toyoake (JP); Hiroyasu Sakamoto, Chiryu (JP); Junichi Ohguchi, Toyoake (JP)

(73) Assignee: Denso Corporation, Kariya (JP)

( * ) Notice: Subject to any disclaimer, the term of this patent is extended or adjusted under 35 U.S.C. 154(b) by 11 days.

(21) Appl. No.: 10/292,631

(22) Filed: Nov. 13, 2002

(65) Prior Publication Data
US 2003/0098007 A1 May 29, 2003

(30) Foreign Application Priority Data
Nov. 26, 2001 (JP) .............................. 2001-359587

(51) Int. Cl.
*F16D 9/08* (2006.01)
(52) U.S. Cl. .................. 464/32; 74/573 R; 474/70; 474/94; 464/76; 464/180
(58) Field of Classification Search ............... 464/32, 464/33, 38, 36, 76, 85, 180; 192/109 R; 74/572, 573 R; 417/223, 319; 474/70, 157, 474/94, 144, 147
See application file for complete search history.

(56) References Cited
U.S. PATENT DOCUMENTS

| 295,215 | A | * | 3/1884 | Whitney ................ 74/573 R X |
|---|---|---|---|---|
| 3,435,695 | A | * | 4/1969 | Rivers ....................... 464/33 X |
| 3,722,644 | A | * | 3/1973 | Steinhagen ............... 464/36 X |
| 5,800,137 | A | * | 9/1998 | Eitai et al. .................. 417/319 |
| 5,975,860 | A | * | 11/1999 | Obayashi et al. ........... 417/223 |
| 6,026,709 | A | * | 2/2000 | Depp et al. ............... 474/94 X |
| 6,234,904 | B1 | * | 5/2001 | Kawaguchi et al. ..... 417/223 X |
| 6,332,842 | B1 | * | 12/2001 | Tabuchi et al. ............... 464/33 |
| 2002/0146326 | A1 | * | 10/2002 | Kawaguchi et al. ......... 417/223 |
| 2004/0052647 | A1 | * | 3/2004 | Kanai et al. ............ 417/223 X |

FOREIGN PATENT DOCUMENTS

| GB | 242413 | * 11/1925 | .................. 464/38 |
|---|---|---|---|
| JP | A-2000-356226 | 12/2000 | |
| JP | A-2001-173676 | 6/2001 | |

* cited by examiner

*Primary Examiner*—Greg Binda
(74) *Attorney, Agent, or Firm*—Posz Law Group, PLC

(57) ABSTRACT

A torque transmission device includes a pulley, a cylindrical member, a torque limiter and a weight member. The pulley is rotated by torque transmitted from a drive source. The cylindrical member is connected to a rotatable shaft of a compressor and is rotated integrally with the rotatable shaft. The torque limiter is arranged between the pulley and the cylindrical member and transmits the torque from the pulley to the cylindrical member. The torque limiter disables the transmission of the torque when the torque becomes equal to or greater than a predetermined value. The weight member is secured to the cylindrical member at a point closer to the rotatable shaft than the torque limiter.

18 Claims, 19 Drawing Sheets

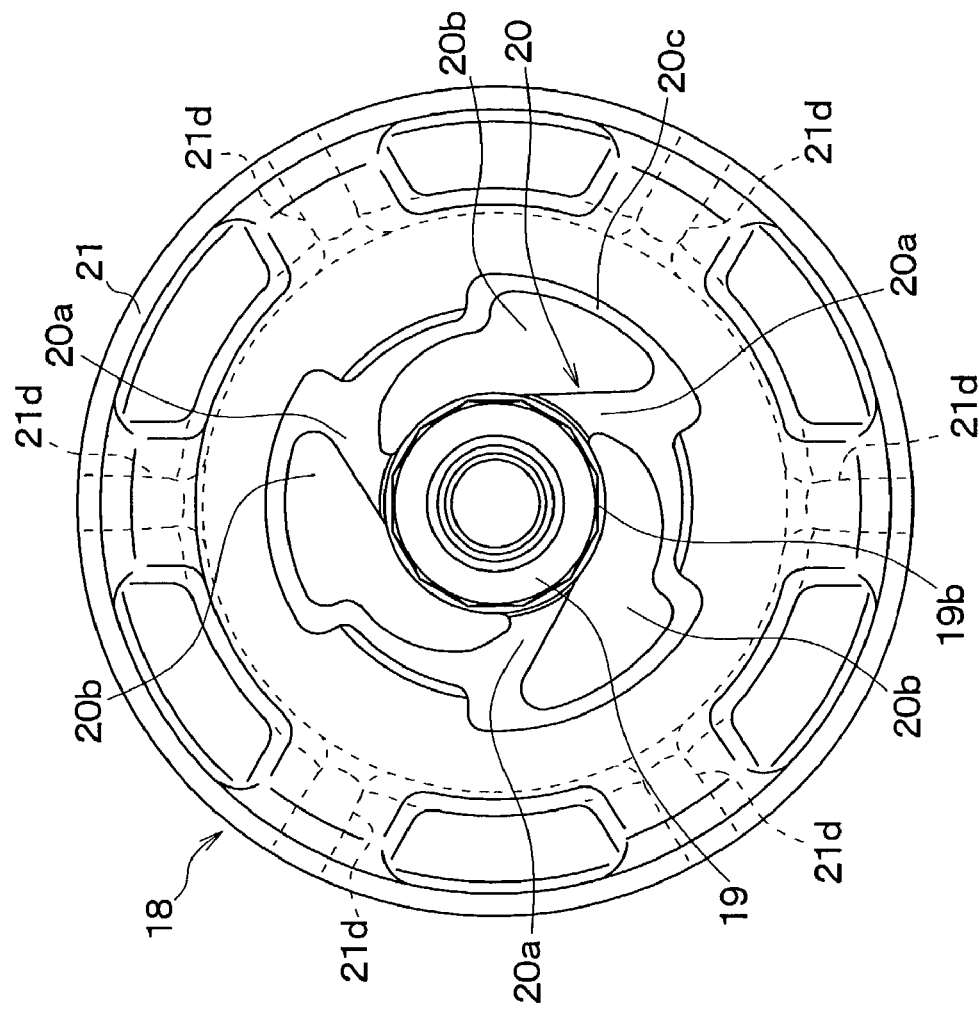
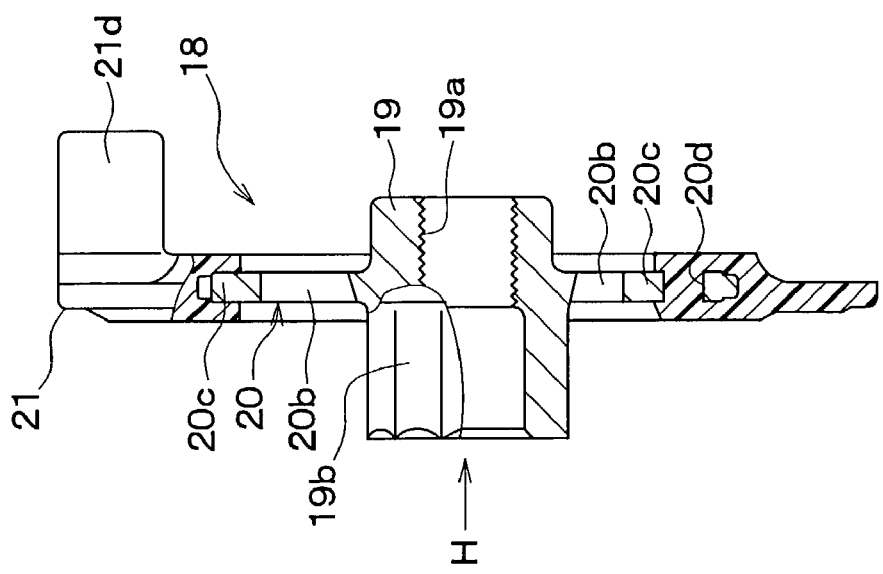

TORQUE TRANSMISSION DEVICE HAVING TORQUE LIMITER

CROSS REFERENCE TO RELATED APPLICATION

This application is based on and incorporates herein by reference Japanese Patent Application No. 2001-359587 filed on Nov. 26, 2001.

BACKGROUND OF THE INVENTION

1. Field of the Invention

The present invention relates to a torque transmission device, which transmits torque from a drive source, such as an engine, to a driven-side rotating device (auxiliary device), such as a compressor.

2. Description of Related Art

Japanese unexamined patent publication No. 2001-41308, which corresponds to U.S. Pat. No. 6,332,842, discloses a torque transmission device that includes a torque limiter. The torque limiter disables transmission of torque from an engine, which serves as a drive source, to a compressor to prevent generation of an excessively large load in the engine when the transmitted torque becomes equal to or greater than a predetermined value due to, for example, a locked state of the compressor (i.e., a state where the compressor cannot rotate) induced by seizing or other failure of the compressor.

In the above torque transmission device, at least one of a first rotator on a driving side and a second rotator on a driven-side has a torque limiter, which is made of resin or sintered metal. When the transmitted torque becomes equal to or greater than the predetermined value due generation of an excessively large load induced by locking of the compressor or the like, the torque limiter is destroyed to disable transmission of the torque.

It has been proposed by the inventors of the present invention to provide a weight member, which serves as an inertia mass, in the second rotator on the driven-side to reduce fluctuations in the torque (fluctuations in rotation) in the driven-side rotating device, such as the compressor.

The inventors of the present invention have found the following fact. That is, the torque limiter is made of the resin or sintered metal and has less strength in comparison to other parts. Thus, when the weight member is installed, and a load, which is induced by vibrations of the weight member, is applied to the torque limiter, a stress of the torque limiter is increased, causing destruction of the torque limiter. That is, even though the transmitted torque has not reached the predetermined value, the load, which is induced by the vibrations of the weight member, causes erroneous activation of the torque limiter and the destruction of the torque limiter.

SUMMARY OF THE INVENTION

The present invention addresses the above disadvantage. Thus, it is an objective of the present invention to avoid erroneous activation of the torque limiter caused by a weight member connected to a second rotator located on a driven-side.

To achieve the objective of the present invention, there is provided a torque transmission device, which transmits torque from a drive source to a rotating device. The torque transmission device includes a first rotator, a second rotator, a torque limiter and a weight member. The first rotator receives the torque transmitted from the drive source and is rotated by the torque. The second rotator is connected to a rotatable element of the rotating device and is rotated integrally with the rotatable element. The torque limiter is arranged in a torque transmission path between the first rotator and the second rotator and transmits the torque, which is transmitted from the drive source to the first rotator, to the second rotator. The torque limiter disables the transmission of the torque from the first rotator to the second rotator when the transmitted torque, which is transmitted from the first rotator to the torque limiter, becomes equal to or greater than a predetermined value. The weight member is secured to the second rotator and serves as an inertia mass. The weight member is secured to the second rotator at a point closer to the rotatable element than the torque limiter.

BRIEF DESCRIPTION OF THE DRAWINGS

The invention, together with additional objectives, features and advantages thereof, will be best understood from the following description, the appended claims and the accompanying drawings in which:

FIG. 7A is a cross sectional view of the hub member before the weight member is assembled to the hub member;

FIG. 7B is a side view taken in the direction of arrow H in FIG. 7A;

DETAILED DESCRIPTION OF THE PREFERRED EMBODIMENTS

Figure 1:
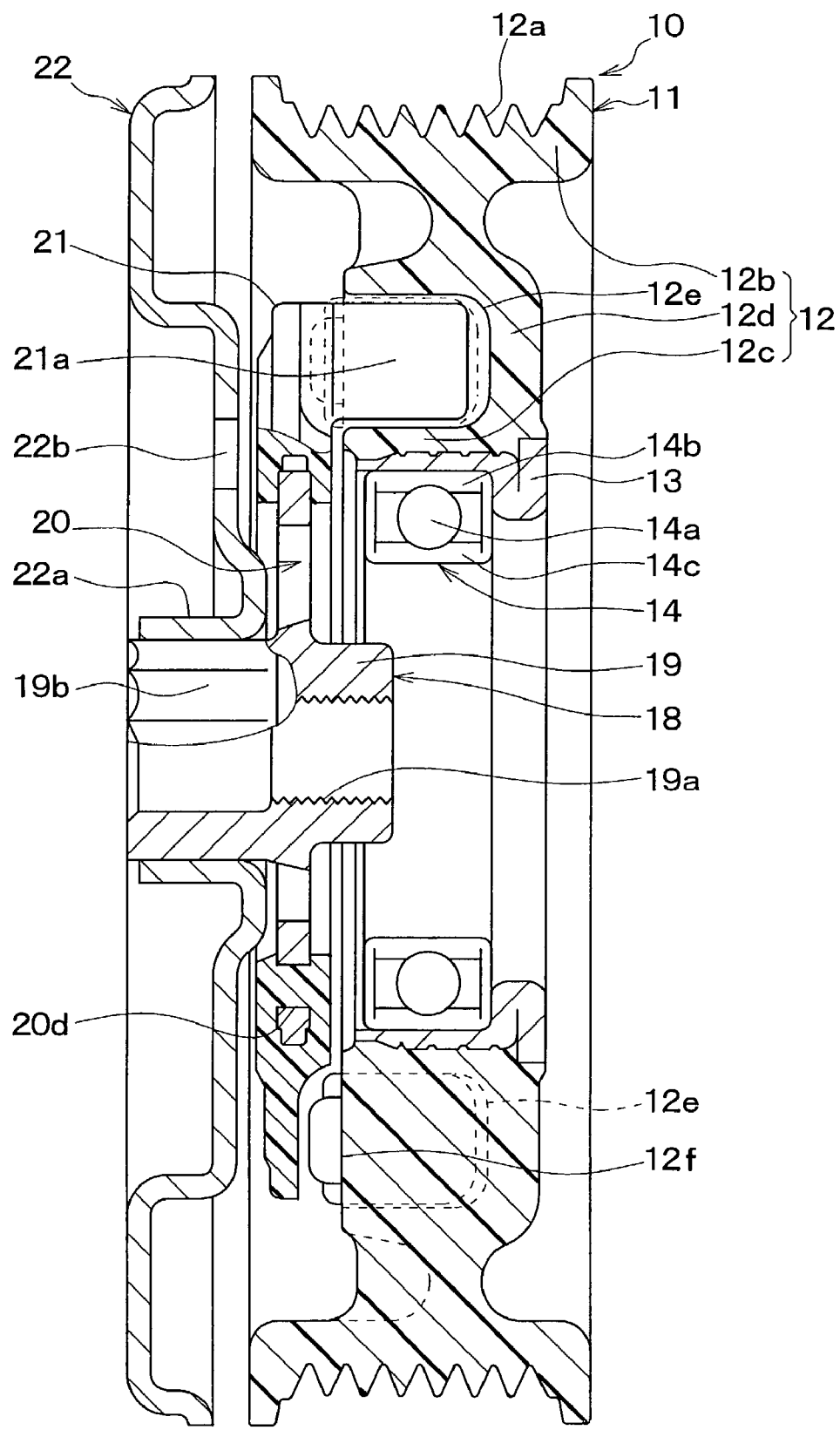
FIG. 1 is a cross sectional view of a torque transmission device according to a first embodiment of the present invention.

Various embodiments of the present invention will be described with reference to the accompanying drawings.

(First Embodiment)

FIGS. 1 to 9 show a first embodiment of the present invention where the invention is embodied in a torque transmission device, which transmits drive force from a vehicle drive engine to a compressor of a refrigeration cycle of a vehicle air-conditioning system.

In the torque transmission device 10, a pulley (serving as a first rotator of the present invention) 11 rotates when the pulley 11 receives drive force (torque) from the vehicle drive engine (drive source) through a poly-V belt or multi-V belt (not shown).

The pulley 11 includes a resin pulley main body 12 and a metal cylindrical member 13. The metal cylindrical member 13 is integrally secured to an inner peripheral section of the pulley main body 12. Specifically, the metal cylindrical member 13 is made of iron metal and is integrally secured to the inner peripheral section of the pulley main body 12 by insert molding at time of molding the pulley main body 12. The pulley main body 12 is preferably made of thermosetting resin, such as phenol resin, to achieve relatively high heat resistance, relatively high mechanical strength, relatively high dimensional precision and the like.

The pulley main body 12 includes an outer cylindrical portion 12b, an inner cylindrical portion 12c and a connecting portion 12d, which are molded together as a single body. The outer cylindrical portion 12b includes a plurality of V-grooves 12a, to which the poly-V belt (not shown) is engaged. The inner cylindrical portion 12c supports the cylindrical member 13. The connecting portion 12d radially extends to connect between the outer cylindrical portion 12b and the inner cylindrical portion 12c. A shape of the connecting portion 12d will be described later.

An outer ring 14b of a radial rolling bearing 14 that includes a plurality of balls 14a is securely press fitted to an inner peripheral section of the metal cylindrical member 13. An inner ring 14c of the bearing 14 is securely press fitted to an outer peripheral section of a cylindrical projection 16a of a front housing 16 of a compressor 15 shown in FIG. 4. The compressor 15 is a compressor of a refrigeration cycle of a vehicle air conditioning system and serves as a driven-side rotating device of the present invention.

A distal end of a rotatable shaft (serving as a rotatable element of the present invention) 17 that drives a compressing mechanism of the compressor 15 is arranged at the center of the cylindrical projection 16a of the front housing 16. An inner cylindrical member 19 of a hub member 18 is threadably secured to a male threaded distal end portion 17a of the rotatable shaft 17.

Figure 5:
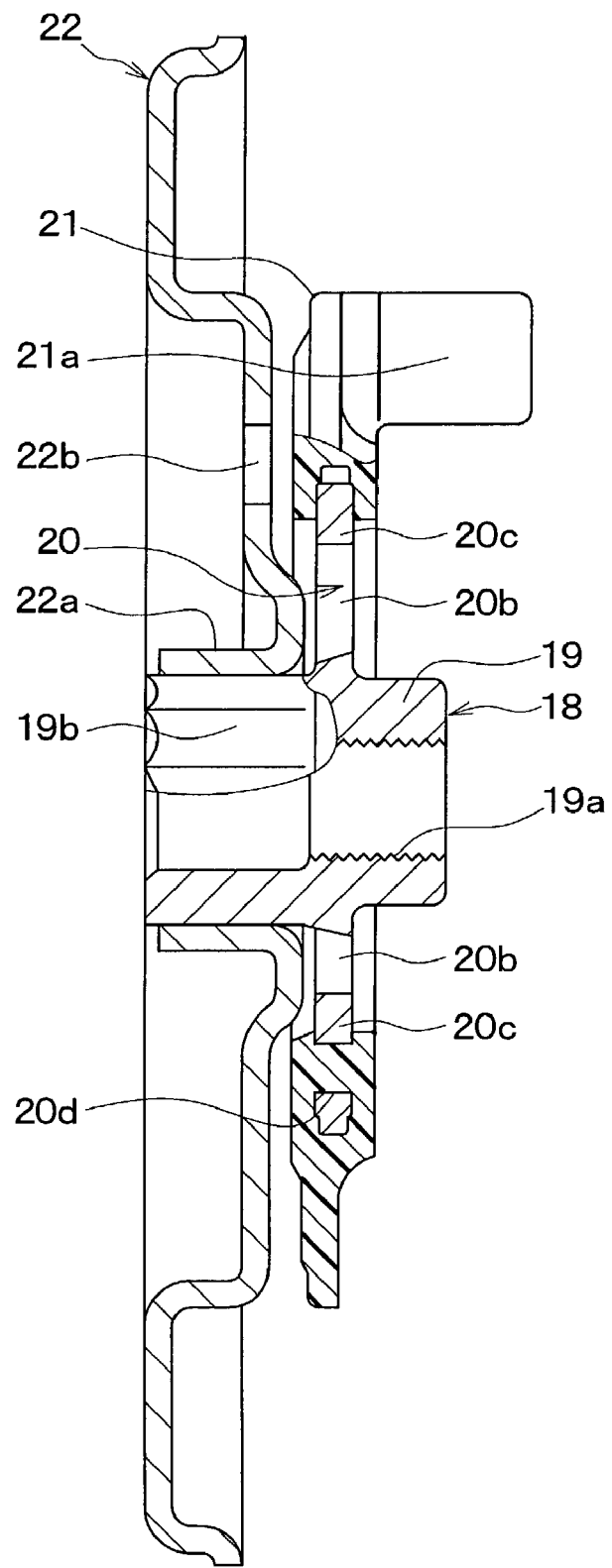
FIG. 5 is a cross sectional view showing the hub member of the torque transmission device according to the first embodiment.

As shown in FIG. 5, the hub member 18 includes the inner cylindrical member 19, a torque limiter 20, an outer annular body 21 and a weight member 22. The torque limiter 20 is arranged in a torque transmission path between the pulley 11 and the inner cylindrical member 19 and is integrally formed with the inner cylindrical member 19. Furthermore, the torque limiter 20 is arranged radially outward of the cylindrical member 19 and is axially spaced from the weight member 22. The torque limiter 20 is axially arranged between the pulley 11 and the weight member 22. The outer annular body 21 is connected to an outer peripheral section of the torque limiter 20. The weight member 22 is secured to the inner cylindrical member 19 and serves as an inertia mass. The radial extent of the weight member 22 is substantially the same as that of the pulley 11.

As shown in FIG. 7A, female threads 19a, which are threadably engaged with the male threaded distal end portion 17a of the rotatable shaft 17, are formed in an inner peripheral surface of the inner cylindrical member 19 on a compressor 15 side of the inner cylindrical member 19.

The inner cylindrical member 19 of the hub member 18 serves as a second rotator of the present invention. In the present embodiment, the torque limiter 20 is integrally formed with the inner cylindrical member 19, so that the inner cylindrical member 19 is made of a material, which has a mechanical strength lower than that of other components. Specifically, the inner cylindrical member 19 is made of sintered metal. The torque limiter 20 is destroyed to disable transmission of the torque when the torque transmitted from the pulley 11 becomes equal to or greater than a predetermined value.

To achieve the torque limiter function, as shown in FIGS. 7A and 7B, the torque limiter 20 includes a plurality of bridges 20a (in the present exemplary case, the number of bridges 20a is three), which are integrally formed together and extend from an outer peripheral surface of the inner cylindrical member 19 at the axial center of the inner cylindrical member 19. That is, a plurality of through holes 20b (in the present exemplary case, the number of through holes 20b is three) is formed in a disk shaped body, which radially outwardly extends from the outer peripheral surface of the inner cylindrical member 19, and each bridge 20a is formed between two corresponding through holes 20b. Outer annular portions 20c are integrally formed in radially outer sections of the bridges 20a, and the outer annular portions 20c are integrally connected to the outer annular body 21. Furthermore, the bridges 20a are axially spaced from the weight member 22.

When the torque transmitted from the pulley 11 to the torque limiter 20 through the outer annular body 21 becomes equal to or greater than the predetermined value, the bridges 20a are destroyed to disable the transmission of the torque.

The outer annular body 21 is made of resin. Specifically, the outer annular body 21 is made of thermoplastic resin having relatively high moldability, such as polyphenylene sulfide (PPS) or nylon, which has relatively high mechanical strength and relatively high thermal stability. Thus, the outer annular portion 20c of the torque limiter 20, which is integrally formed with the inner cylindrical member 19, can be integrally connected to the outer annular body 21 by the insert molding. The outer annular portion 20c includes a plurality of through holes 20d (for example, the number of through holes 20d is six), which axially penetrate through the outer annular portion 20c and are arranged in a circumferential direction (FIGS. 1, 5 and 7A). By filling the resin material of the outer annular body 21 into each of the through holes 20d, a bonding strength between the outer annular portion 20c of the torque limiter 20 and the outer annular body 21 is increased.

Figure 3:
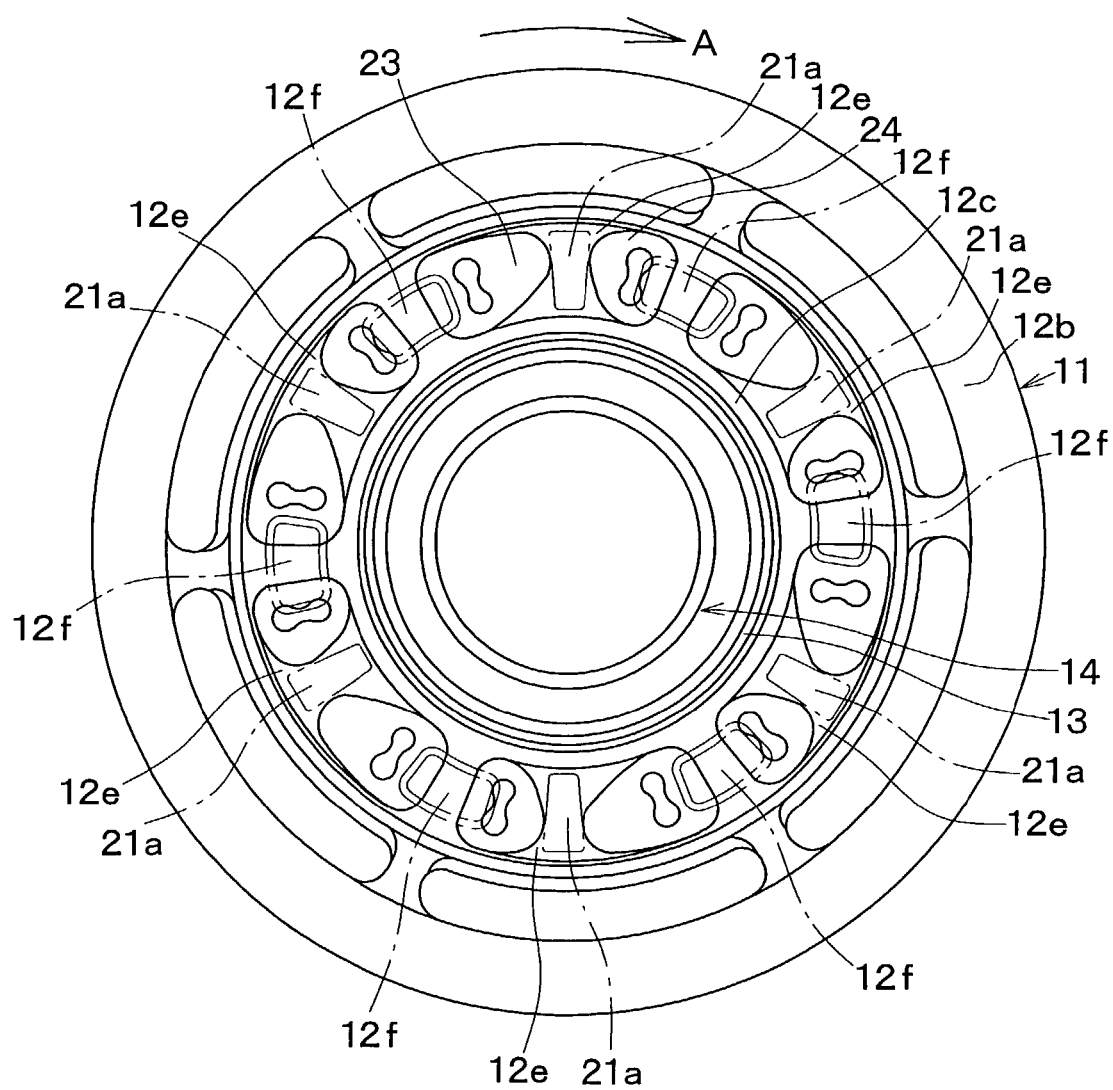
FIG. 3 is a side view as taken from the left of FIG. 1 after removal of a hub member, showing a structure of a pulley.
Figure 4:
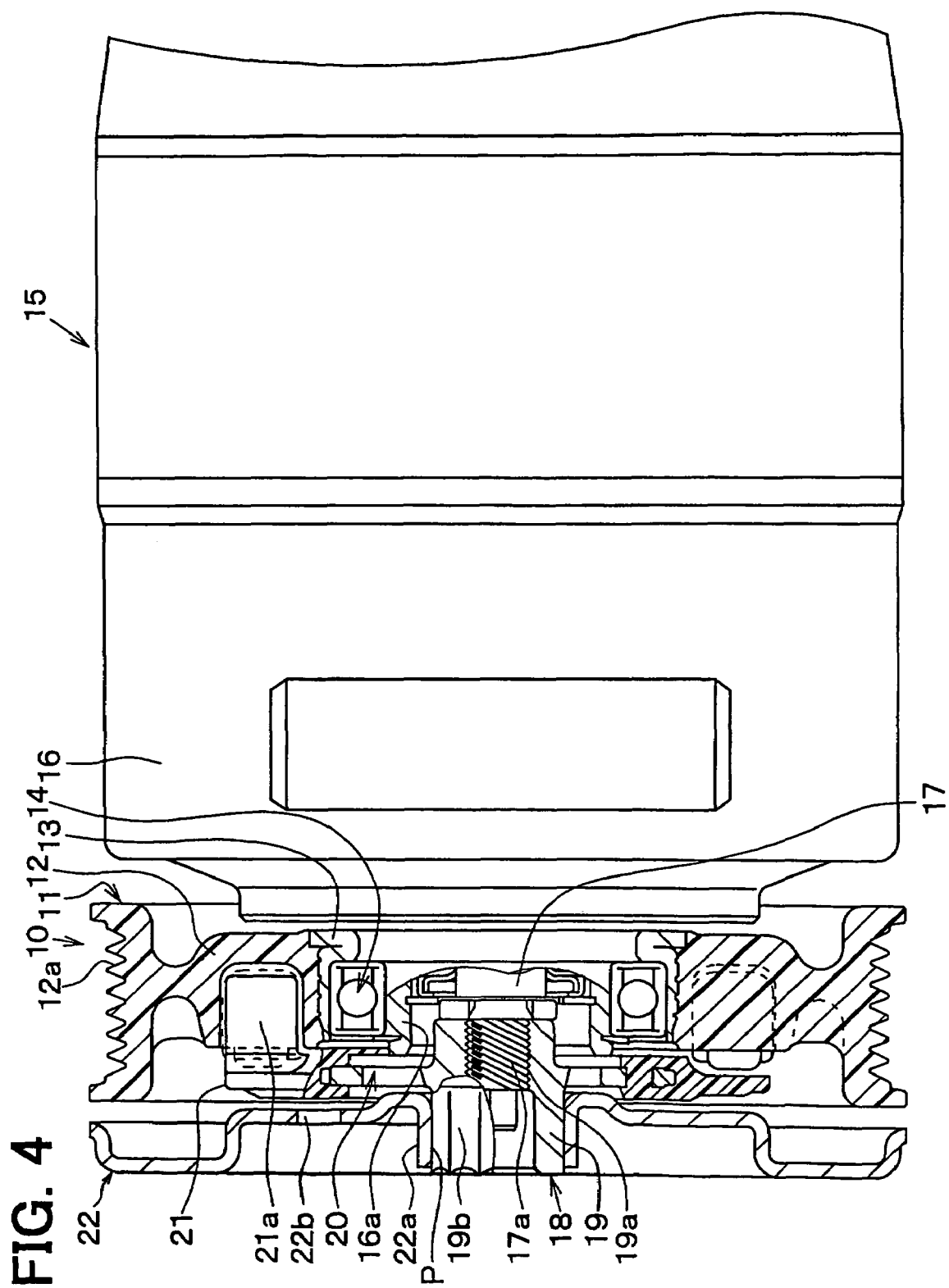
FIG. 4 is a partial cross sectional view showing an assembled state where the torque transmission device of the first embodiment is assembled to a vehicle air conditioning compressor.

A plurality of projections 21a is integrally formed in and projects from the outer annular body 21 on a pulley main body 12 side of the annular body 21 toward the pulley main body 12. As shown in FIG. 3, the projections 21a (in the present exemplary case, the number of projections 21a is six) are arranged at substantially equal intervals in a circumferential direction, and each projection 21a indicated by a dot-dot-dash line in FIG. 3 has a generally trapezoidal cross section. FIG. 3 is a view taken from the left of FIG. 1 and shows the pulley 11 after removal of the hub member 18 from the pulley 11. Because of this, in FIG. 3, each projection 21a of the hub member 18 is indicated by the dot-dot-dash line.

As shown in FIGS. 1 and 3, in the pulley main body 12, a plurality of arcuate recesses 12e (in the present exemplary case, the number of arcuate recesses 12 is six) is formed in the connecting portion 12d, which connects between the outer cylindrical portion 12b and the inner cylindrical portion 12c. A plurality of projections 12f (in the present exemplary case, the number of projections 12f is six) is formed in the inner cylindrical portion 12c. The projections 12f are arranged at generally equal intervals in the circumferential direction. Each projection 12f extends radially outwardly from the inner cylindrical portion 12c toward the outer annular body 21 of the hub member 18 (FIG. 1) and is positioned between two corresponding recesses 12e.

With reference to FIG. 3, when the pulley 11 and the hub member 18 are installed to the compressor 15, the projections 21a of the outer annular body 21 of the hub member 18 and the projections 12f of the pulley 11 are alternately arranged in the circumferential direction.

A plurality of pairs of resilient damper members 23, 24 (each pair includes one resilient damper member 23 and one resilient damper member 24) are arranged such that each of the resilient damper members 23, 24 is located between the corresponding projection 12f and the corresponding projection 21a. The resilient damper members 23, 24 are made of a resiliently deformable material and conduct the torque applied to the pulley 11 to the hub member 18. The resilient damper members 23, 24 are preferably made of EPDM (ethylene-propylene terpolymer) rubber. Each resilient damper member 23, 24 is resiliently deformed between the corresponding projection 12f and the corresponding projection 12a to transmit the torque from the pulley 11 to the hub member 18 and also to reduce fluctuations in the drive torque of the compressor 15. A rotational direction of the pulley 11 is the direction of arrow A in FIG. 3.

Figure 2:
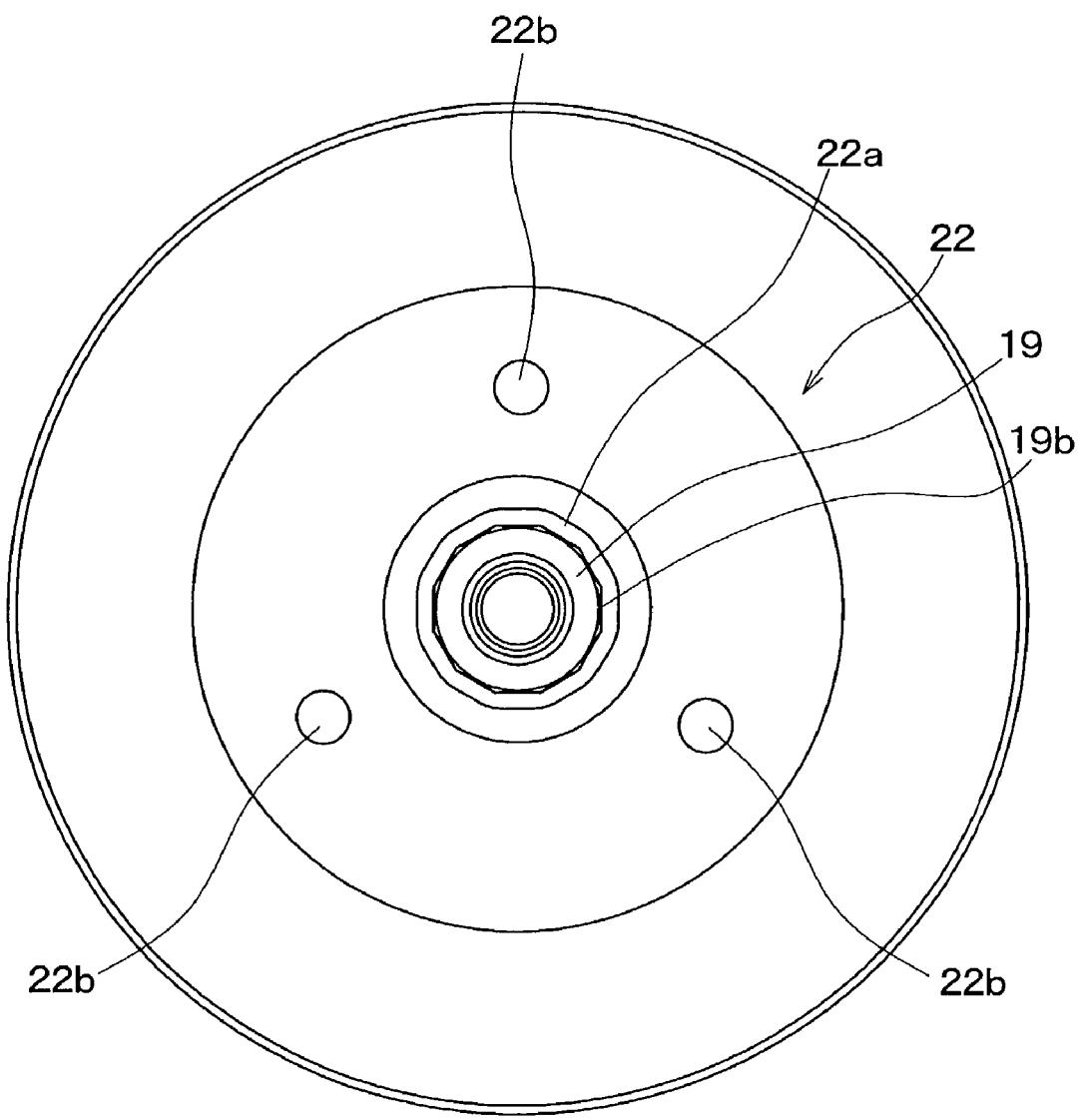
FIG. 2 is a side view as taken from the left of FIG. 1.

Next, the weight member 22, which serves as the inertia mass of the hub member 18, will be described. As shown in FIG. 2, the weight member 22 is a disk-shaped member having an outer diameter that is substantially the same as that of the pulley 11 (i.e., the radial extent of the weight member 22 is substantially the same as that of the pulley 11). A wall thickness, a shape and the like of the weight member 22 are determined to achieve a predetermined moment of inertia for reducing fluctuations in the drive torque of the compressor 15. A material of the weight member 22 is preferably metal, such as iron metal for achieving a relatively high mechanical strength, a relatively high manufacturability and the like.

Figure 6:
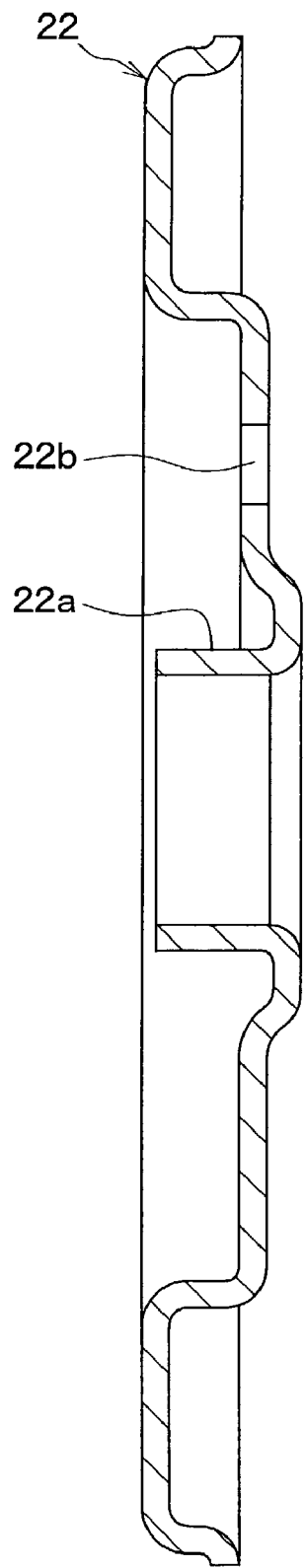
FIG. 6 is a cross sectional view of a weight member of the torque transmission device according to the first embodiment.
Figure 8:
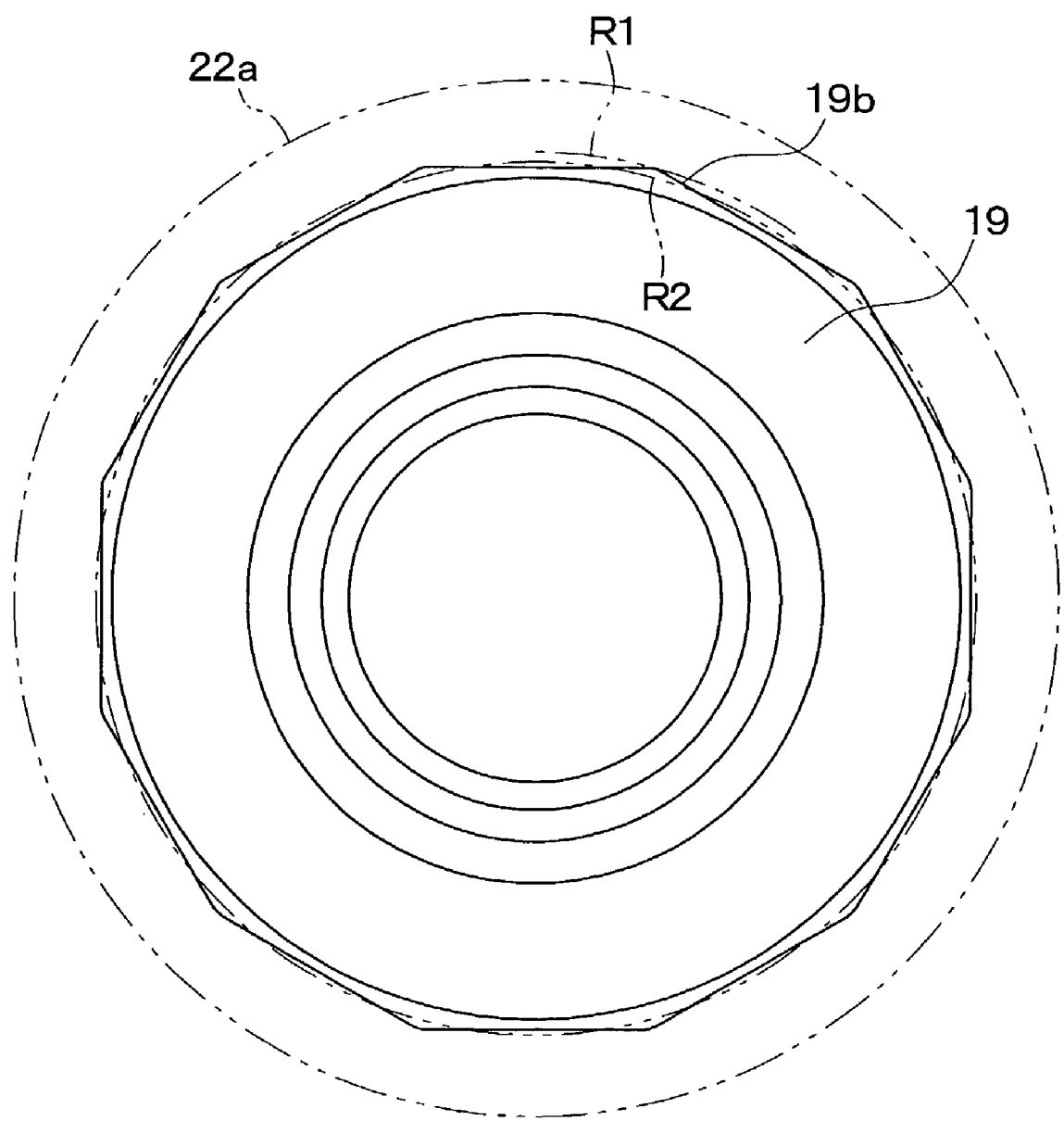
FIG. 8 is a partial side view of an inner cylindrical member of the hub member according to the first embodiment, showing a state before securely press fitting the weight member to the inner cylindrical member.
Figure 9:
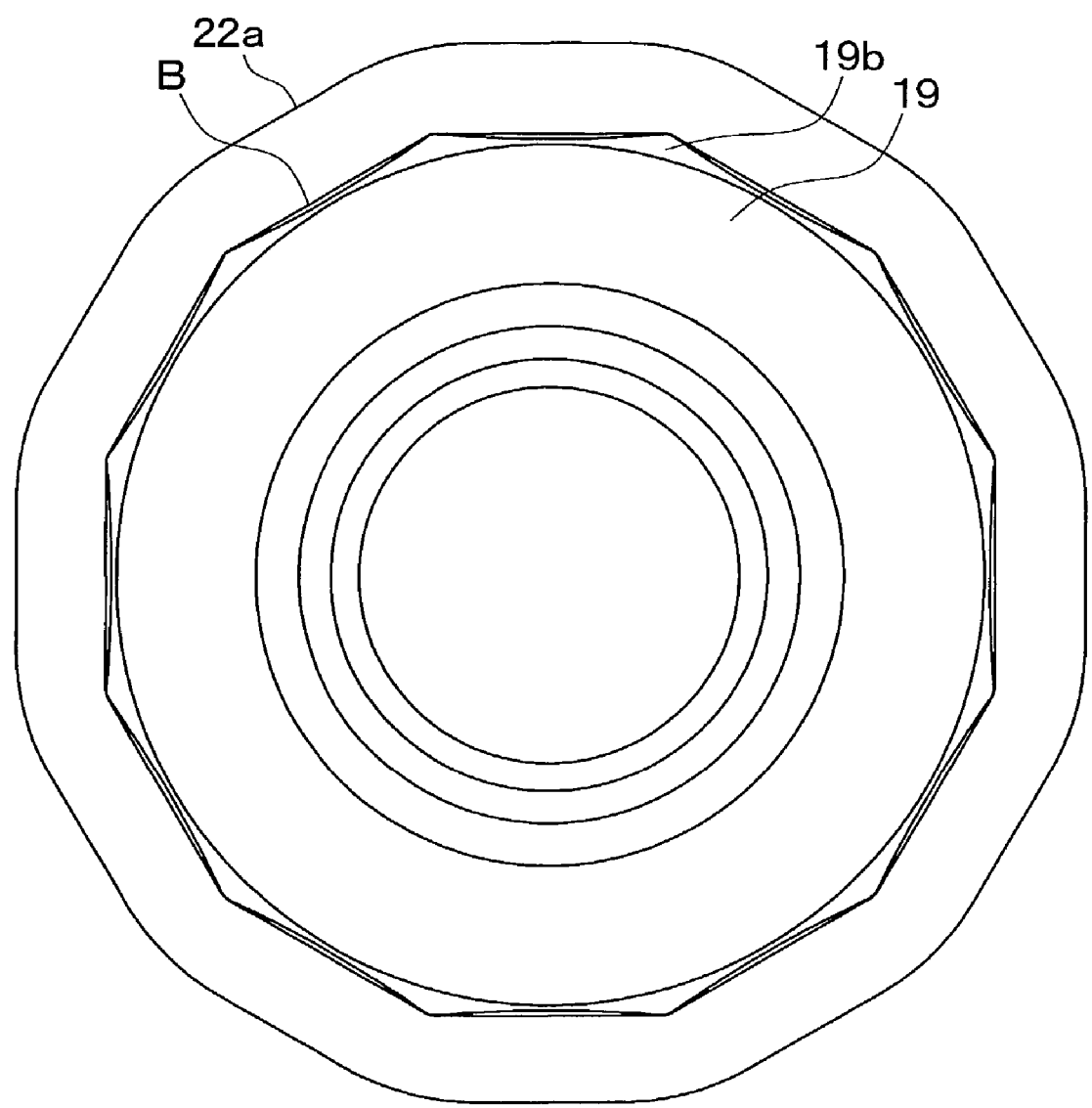
FIG. 9 is a partial side view showing a state after the weight member is securely press fitted to the inner cylindrical member of the hub member according to the first embodiment.

As shown in FIG. 6, the weight member 22 has a cylindrical inner peripheral section 22a. The cylindrical inner peripheral section 22a is press fitted over the outer peripheral surface of the inner cylindrical member 19 of the hub member 18 on a side of the inner cylindrical member 19 opposite to the compressor 15. The structure for achieving the press fitting will be described in greater details. FIG. 8 shows a state before press fitting of the cylindrical inner peripheral section 22a of the weight member 22 over the outer peripheral surface of the inner cylindrical member 19. FIG. 9 shows a state after press fitting of the cylindrical inner peripheral section 22a of the weight member 22 over the outer peripheral surface of the inner cylindrical member 19. A polygonal outer peripheral surface 19b is formed in the outer peripheral surface of the inner cylindrical member 19 of the hub member 18 on a side of the outer peripheral surface of the inner cylindrical member 19 opposite to the compressor 15. An outer diameter R1 of an imaginary circumcircle, which passes through all the vertices of the polygon defined by the polygonal outer surface 19b, is larger than an inner diameter R2 of the cylindrical inner peripheral section 22a of the weight member 22 by a predetermined amount to provide a press fit clearance. As a specific dimensional example, R1 can be set to 20.8 mm, and R2 can be set to 20.6 mm.

With the above settings, the cylindrical inner peripheral section 22a of the weight member 22 can be securely press fitted over the polygonal outer peripheral surface 19b of the inner cylindrical member 19 of the hub member 18 with a predetermined surface pressure. The press fitting of the cylindrical surface of the weight member 22 over the polygonal outer peripheral surface 19b of the hub member 18 provides the following two advantages.

First, even when a coating is formed by surface treatment over the surfaces of the inner cylindrical member 19, the press fitting securing force of the weight member 22 can be advantageously stabilized by eliminating influences of a thickness of the coating. That is, although a corrosion inhibiting surface coating is applied over the surfaces of the inner cylindrical member 19 made of the sintered metal after formation of the female threads 19a and the like, the coating is removed at the vertices of the polygonal outer peripheral surface 19b at time of press fitting of the weight member 22. Thus, the exposed metal surfaces at the vertices of the polygonal outer peripheral surface 19b of the inner cylindrical member 19 directly bite into the cylindrical surface of the cylindrical inner peripheral section 22a. As a result, the cylindrical inner peripheral section 22a of the weight member 22 is securely press fitted over the polygonal outer peripheral surface 19b of the inner cylindrical member 19 while the surface pressure at the engaging surfaces of the cylindrical inner peripheral section 22a and of the inner cylindrical member 19 is increased. Therefore, the cylindrical inner peripheral section 22a of the weight member 22 can be always stably secured to the inner cylindrical member 19 while eliminating the influences of the thickness of the surface coating.

Even in a case where the surface coating is not present on the inner cylindrical member 19, the surface pressure can be advantageously increased at the engaging surfaces of the inner cylindrical member 19 and of the cylindrical inner peripheral section 22a at the vertices of the polygonal outer surface 19b of the inner cylindrical member 19 in comparison to a case where the outer peripheral surface of the inner cylindrical member 19 is a smooth cylindrical surface. As a result, the press fitting securing force can be stabilized irrespective of the variation in the press fit clearance.

Second, a variation in a press fit load of the weight member 22 can be advantageously reduced. That is, in the case where the outer peripheral surface of the inner cylindrical member 19 is the smooth cylindrical surface, a variation in the press fit clearance causes a variation in the press fit load of the weight member 22, resulting in the less efficient press fitting operation.

However, according to the present embodiment, as shown in FIG. 9, even after the press fitting of the weight member 22, a small clearance B is present between the outer peripheral surface of the inner cylindrical member 19 and the inner peripheral surface of the cylindrical inner peripheral section 22a of the weight member 22 at each corresponding intermediate section between two corresponding vertices of the polygonal outer surface 19b of the inner cylindrical member 19. Thus, even when there is a variation in the press fitting clearance, the small clearance B allows a reduction in the variation of the press fit load of the weight member 22.

At the installation of the hub member 18, the inner cylindrical member 19, which has the torque limiter 20, is first formed by die forming of the sintered metal. During the die forming, the polygonal outer peripheral surface 19b of the inner cylindrical member 19 is also formed. Next, the inner cylindrical member 19 is integrated with the resin outer annular body 21 by insert molding. FIGS. 7A and 7B show the state after this integration process.

Next, the cylindrical inner peripheral section 22a of the weight member 22 is securely press fitted over the polygonal outer peripheral surface 19b of the inner cylindrical member 19. Thereafter, the entire hub member 18 is threadably secured to the male threaded distal portion 17a of the rotatable shaft 17 of the compressor 15.

To threadably secure the entire hub 18, the weight member 22 has a plurality of jig receiving holes 22b (in the present exemplary case, the number of the jig receiving holes 22b is three) at a radially intermediate section of the weight member 22. That is, corresponding portions of a tightening jig (not shown) are inserted in the jig receiving holes 22b, and the tightening jig is rotated to apply a tightening force to the entire hub member 18 to threadably secure the hub member 18.

Next, operation of the torque transmission device of the present embodiment will be described. When rotational force (torque) is transmitted from the vehicle engine (not shown) to the pulley 11 through the poly-V belt, the torque of the pulley 11 is transmitted to the resin outer annular body 21 of the hub member 18 through the resilient damper members 23, 24.

In the hub member 18, the outer annular body 21, the torque limiter 20, the inner cylindrical member 19 and the weight member 22 are integrated, and the inner cylindrical member 19 of the hub member 18 is threadably secured to the male threaded distal end portion 17a of the rotatable shaft 17 of the compressor 15. Thus, the rotatable shaft 17 is rotated by the torque transmitted to the hub member 18, and the compressor 15 is driven.

The above described operation is the normal operation, and the drive torque fluctuates through repeat of compression and intake operations of refrigerant in the compressor 15. However, by installing the weight member 22, which serves as the inertia mass, to the hub member 18, the fluctuations in the drive torque of the compressor 15 can be reduced.

Furthermore, the resilient damper members 23, 24 are arranged in the torque transmission path located between the outer annular body 21 of the hub member 18 and the pulley 11, so that expansion and compression of the resiliently deformed damper members 23, 24 allow reduction of the fluctuations of the drive torque of the compressor 15.

On the other hand, when the compressor 15 is locked, for example, by a failure of the compressor 15, such as seizing, the torque applied to the torque limiter 20 of the hub member 18 becomes equal to or greater than the predetermined value. This causes destruction of the bridges 20a of the torque limiter 20, so that the transmission of the torque is disabled.

The weight member 22 is secured to the inner cylindrical member 19 of the hub member 18 at the inner peripheral section of the weight member 22, so that the weight member 22 is secured to the hub member 18 at a point P, which is closer to the rotatable shaft 17 than the torque limiter 20. That is, the point P is radially inward of the torciue limiter 20. In other words, the weight member 22 is secured to the second rotator 19 at a point P that is radially inward of the torciue limiter 20. In addition, an outer peripheral edge of the weight member 22 is located radially outward of the torque limiter 20. Thus, when the weight member 22 is rotated and is vibrated during the operation of the vehicle engine, the load induced by the vibrations of the weight member 22 is applied only to the inner cylindrical member 19 and is not applied to the torque limiter 20, which is arranged radially outward of the inner cylindrical member 19.

If the weight member 22 is secured to the outer annular body 21 arranged radially outward of the torque limiter 20, the load induced by the vibrations of the weight member 22 is applied to the torque limiter 20, so that a stress of the torque limiter 20 is increased. This causes erroneous activation (or improper activation) of the torque limiter 20 when the torque is less than the predetermined value.

However, according to the present embodiment, the load induced by the vibrations of the weight member 22 is not directly applied to the torque limiter 20, so that the erroneous activation of the torque limiter 20 induced by the vibrations of the weight member 22 can be avoided.

(Second Embodiment)

Figure 10:
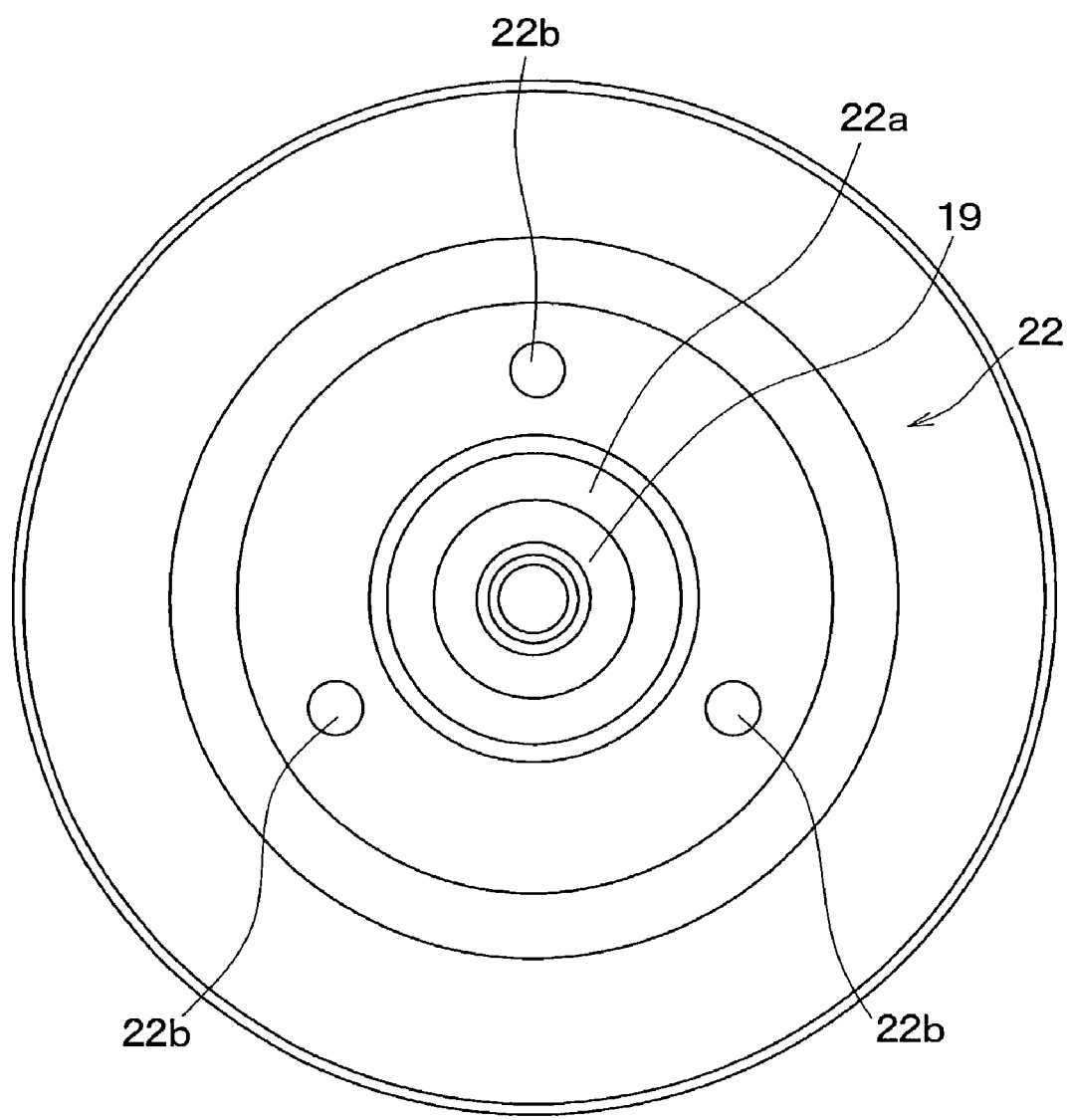
FIG. 10 is a side view showing a torque transmission device according to a second embodiment of the present invention.
Figure 11:
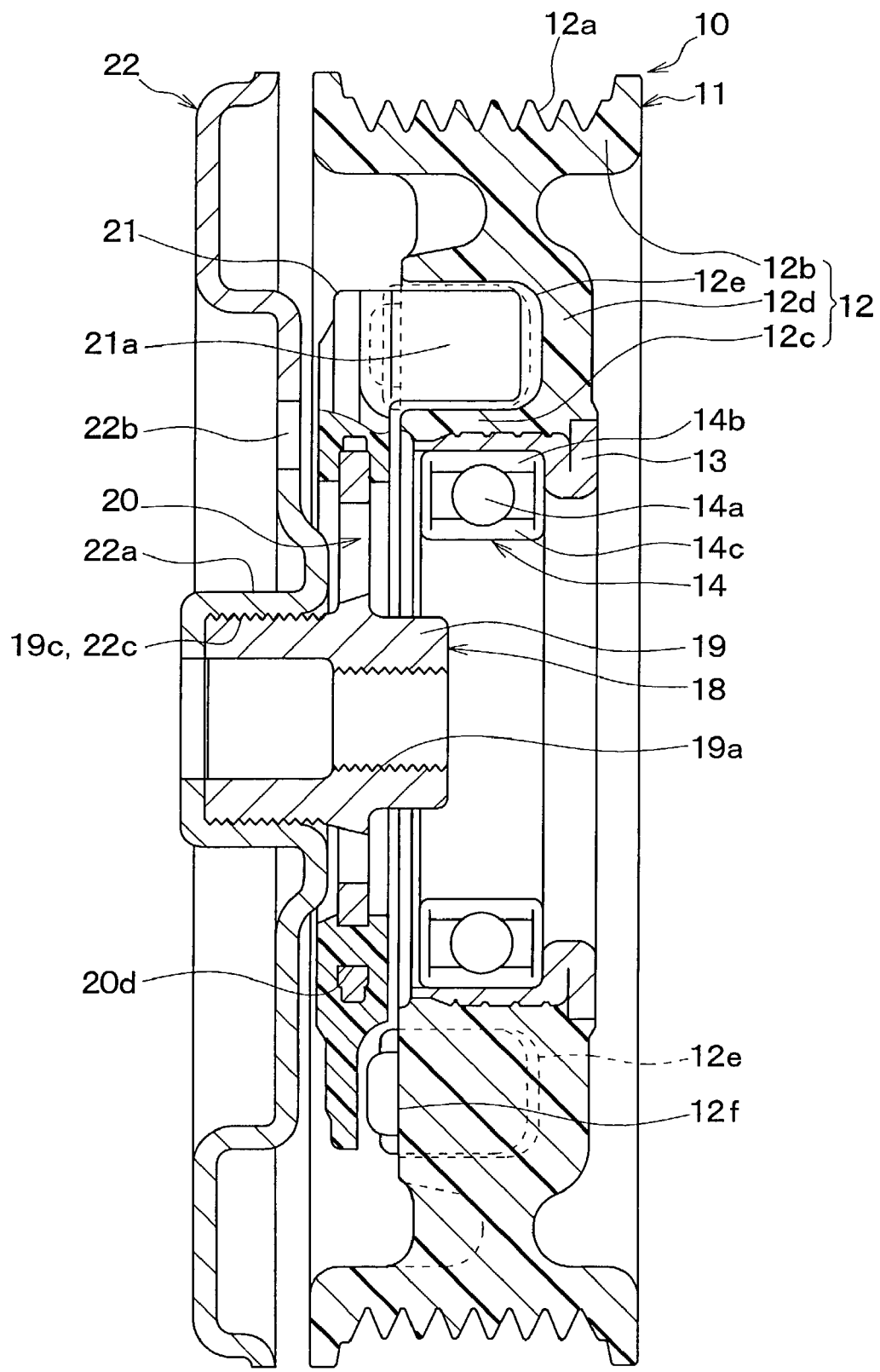
FIG. 11 is a cross sectional view of FIG. 10.
Figure 12:
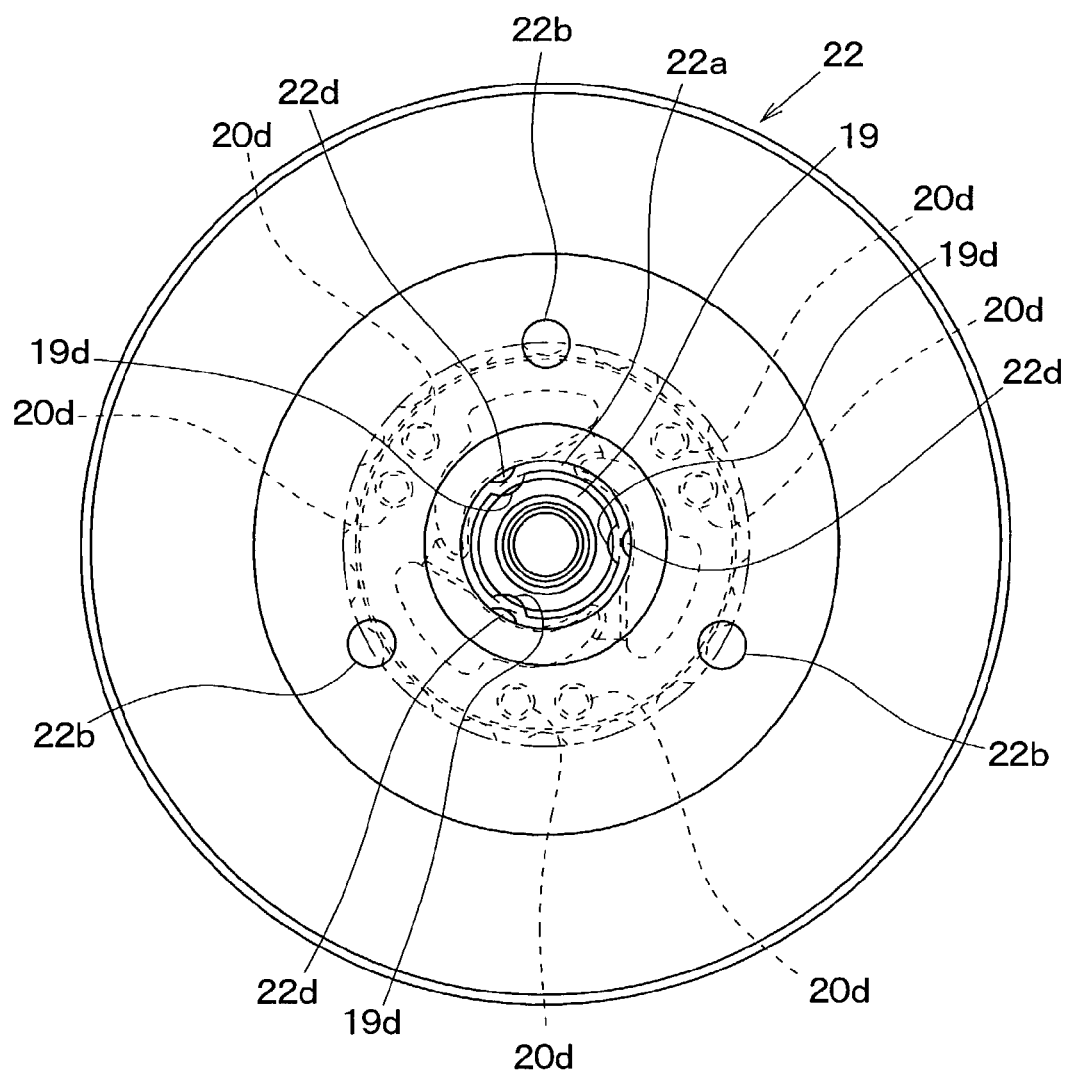
FIG. 12 is a side view of a torque transmission device according to a third embodiment of the present invention.
Figure 13:
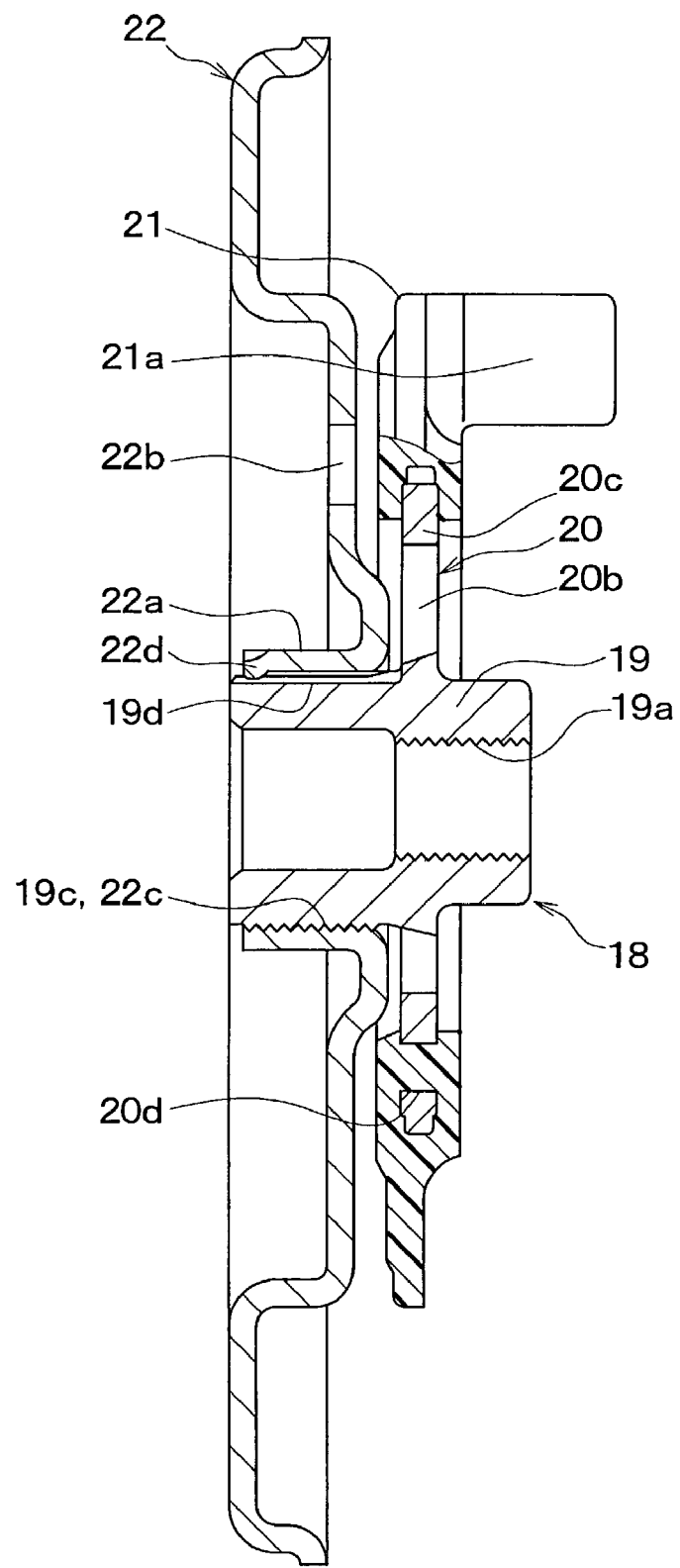
FIG. 13 is a cross sectional view of a hub member of the transmission device according to the third embodiment.
Figure 14:
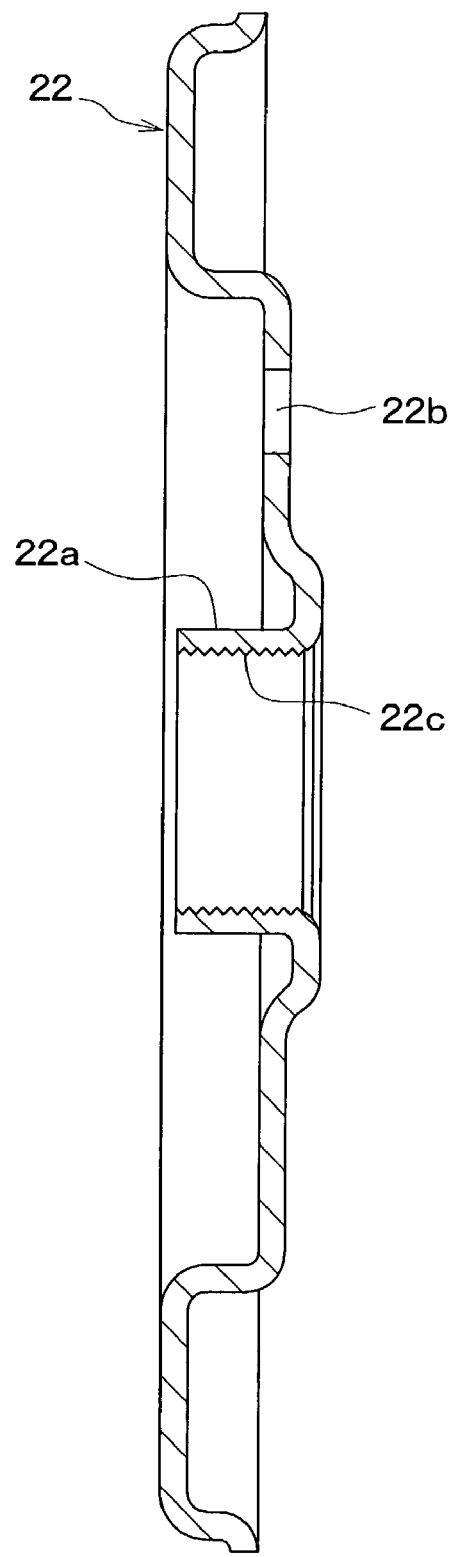
FIG. 14 is a cross sectional view of a weight member of the transmission device according to the third embodiment.

In the first embodiment, the cylindrical inner peripheral section 22a of the weight member 22 is securely press fitted over the polygonal outer peripheral surface 19b of the inner cylindrical member 19 of the hub member 18. However, in a second embodiment of the present invention, as shown in FIGS. 10 and 11, a male threaded portion 19c is formed in the outer peripheral surface of the inner cylindrical member 19 of the hub member 18 on a side of the inner cylindrical member 19 opposite to the compressor 15. Furthermore, a female threaded portion 22c is formed in the inner peripheral surface of the cylindrical inner peripheral section 22a of the weight member 22. By threadably engaging the female threaded portion 22c with the male threaded portion 19c of the inner cylindrical member 19, the cylindrical inner peripheral section 22a of the weight member 22 is threadably secured to the inner cylindrical member 19 of the hub member 18. Other than those described above, the second embodiment is substantially the same as the first embodiment.

(Third Embodiment)

In the second embodiment, the cylindrical inner peripheral section 22a of the weight member 22 is only threadably secured to the inner cylindrical member 19 of the hub member 18. In a third embodiment of the present invention, the cylindrical inner peripheral section 22a of the weight member 22 is more reliably secured to the inner cylindrical member 19 of the hub member 18 through use of threadable engagement and deformation.

Figure 15:
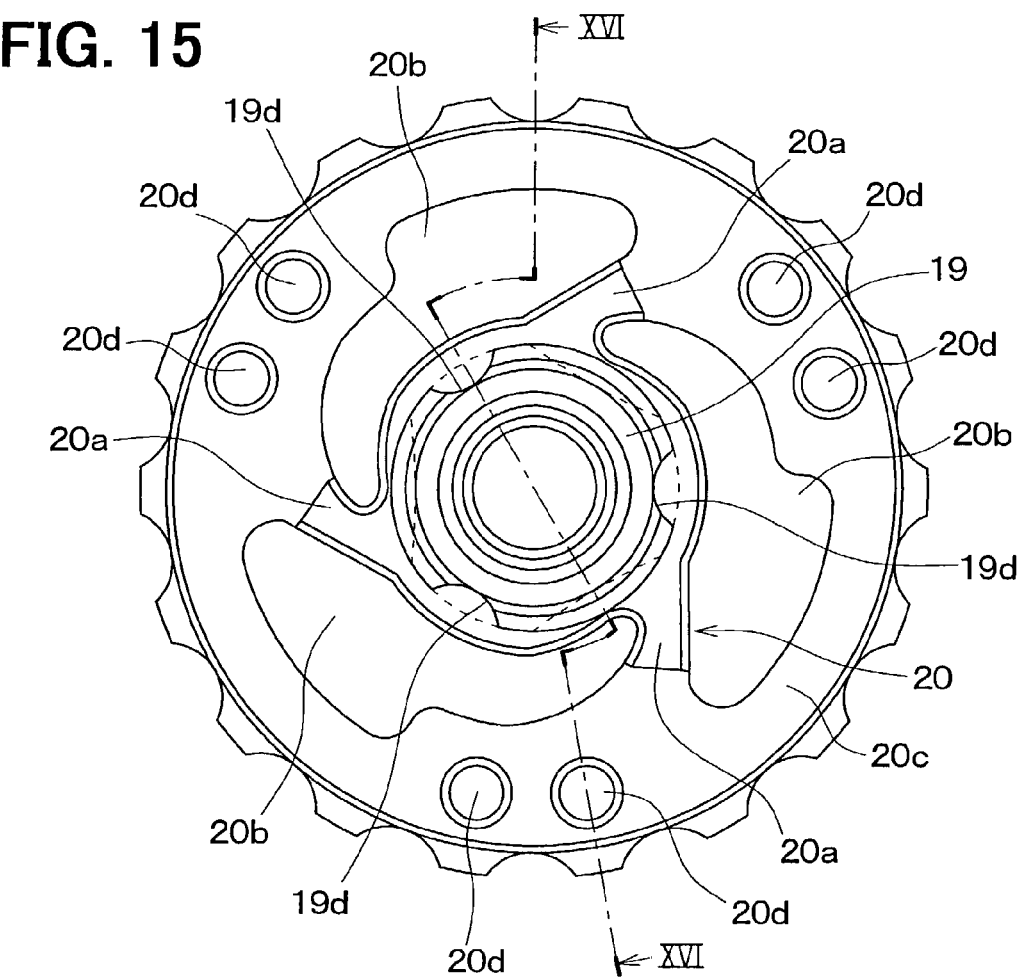
FIG. 15 is a side view of an inner cylindrical member of the hub member according to the third embodiment.
Figure 16:
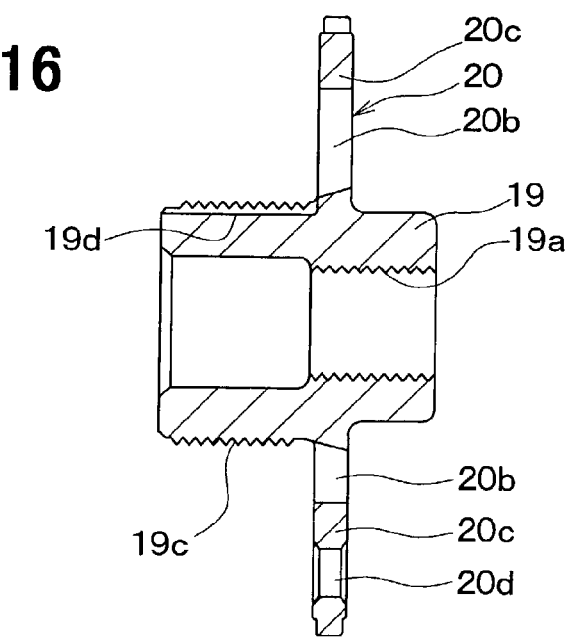
FIG. 16 is a cross sectional view taken along line XVI-XVI in FIG. 15.
Figure 17:
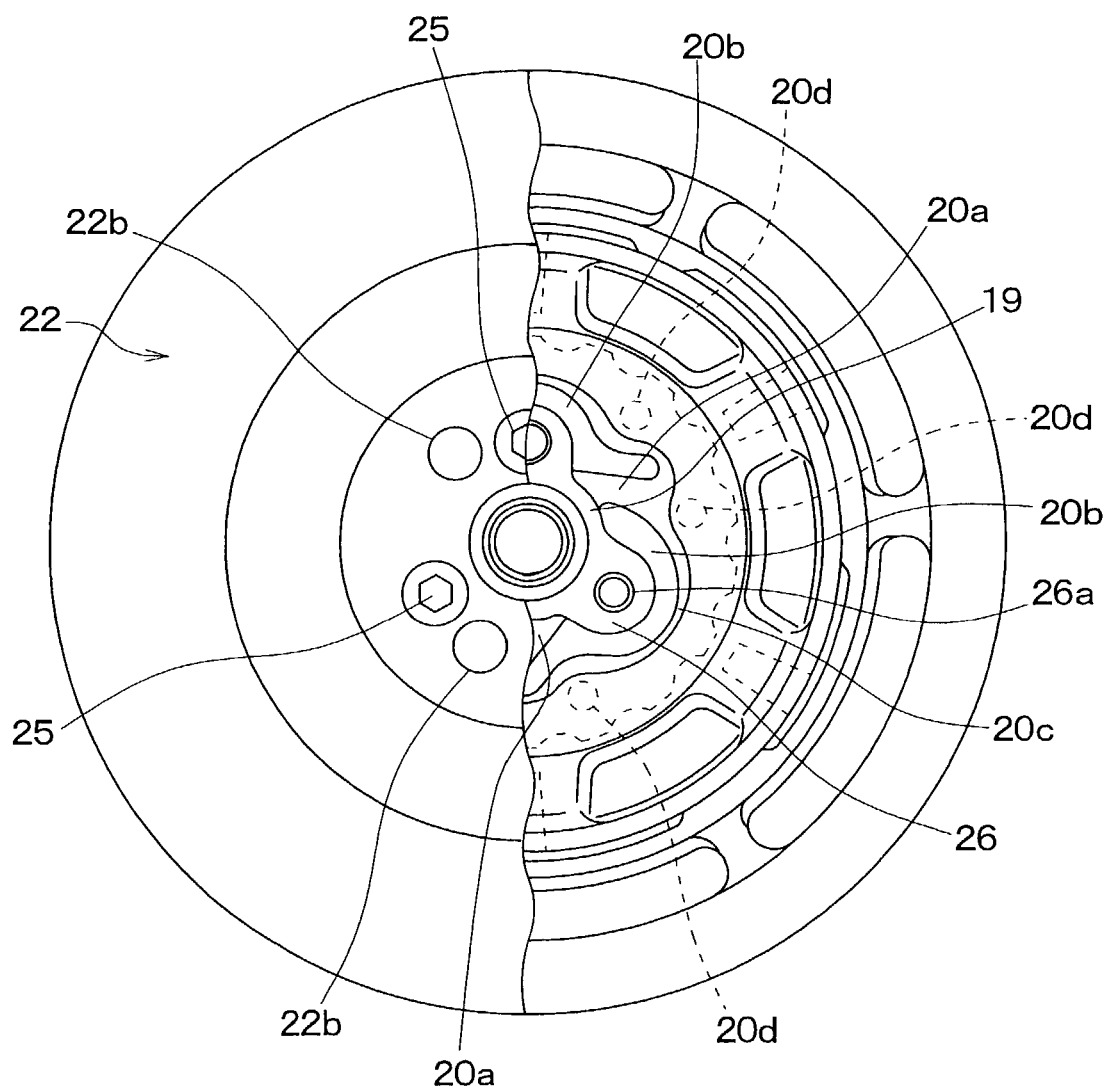
FIG. 17 is a half fragmented cross sectional view of a torque transmission device according to a fourth embodiment of the present invention.

FIGS. 12 to 16 show the third embodiment. Similar to the second embodiment, the male threaded portion 19c is formed in the outer peripheral surface of the inner cylindrical member 19 of the hub member 18, and the female threaded portion 22c is formed in the inner peripheral surface of the cylindrical inner peripheral section 22a of the weight member 22. However, in the third embodiment, besides the male threaded portion 19c, a plurality of recesses 19*d* (in the present exemplary case, the number of the recesses 19*d* is three) is formed in the outer peripheral surface of the inner cylindrical member 19. As shown in FIGS. 15 and 16, the recesses 19*d* are arranged at generally equal intervals in the circumferential direction, and each recess 19*d* has an arcuate cross section. An axial extent of each recess 19*d* on the inner cylindrical member 19 is the same as that of the male threaded portion 19*c*.

In the third embodiment, the female threaded portion 22*c* of the cylindrical inner peripheral section 22*a* of the weight member 22 is threadably engaged with the male threaded portion 19*c* of the inner cylindrical member 19, so that the cylindrical inner peripheral section 22*a* of the weight member 22 is threadably secured to the inner cylindrical member 19 of the hub member 18. Thereafter, at the axial end of the cylindrical inner peripheral section 22*a* of the weight member 22 (i.e., the axial end of the cylindrical inner peripheral section 22*a* opposite to the compressor 15), corresponding portions, which are located over the recesses 19*d*, are radially inwardly deformed and biased by applying pressure to form deformed portions 22*d* (FIGS. 12 and 13), each of which is deformed and is received in the corresponding recess 19*d*.

In this way, in the third embodiment, the cylindrical inner peripheral section 22*a* of the weight member 22 is more reliably secured to the inner cylindrical member 19 of the hub member 18 through use of threadable engagement and the deformation.

(Fourth Embodiment)

FIGS. 17 to 21 show a fourth embodiment of the present invention. An inner peripheral section of the weight member 22 is secured to the hub member 18 by a plurality of bolts 25.

Figure 19:
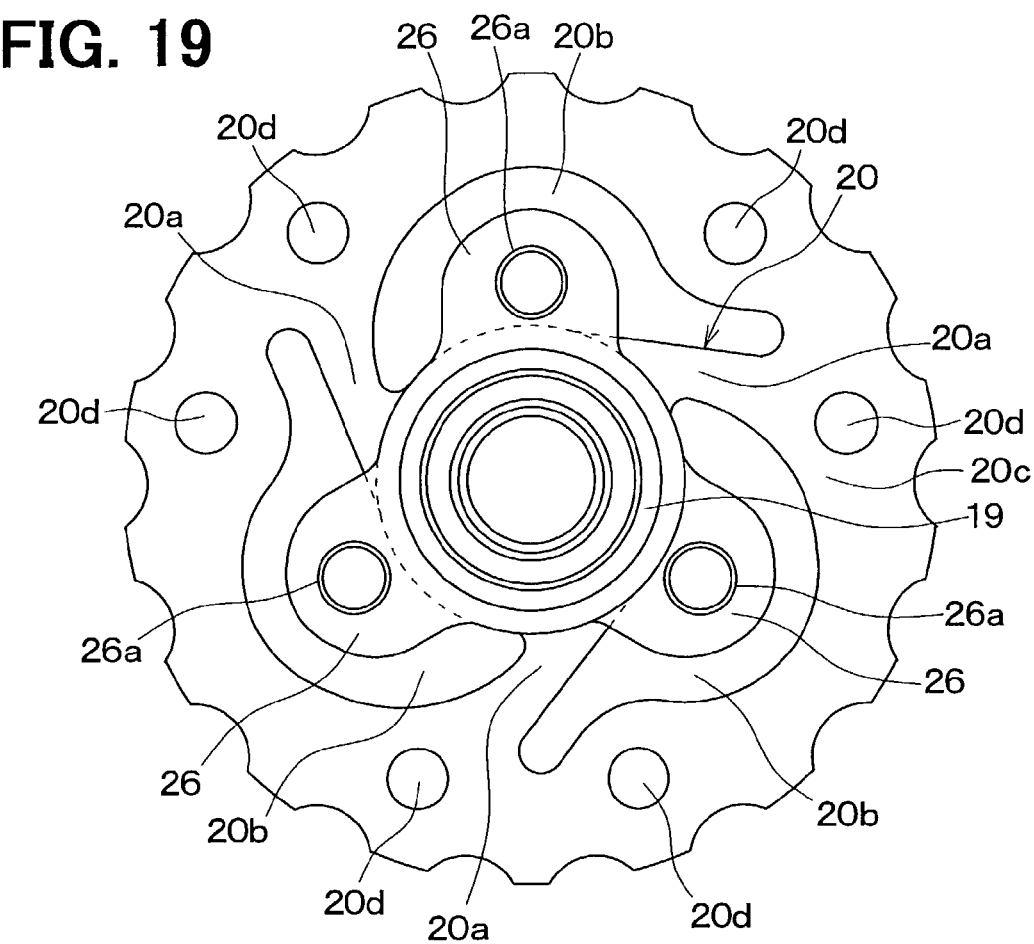
FIG. 19 is a left side view of an inner cylindrical member of a hub member according to a fourth embodiment of the present invention.
Figure 20:
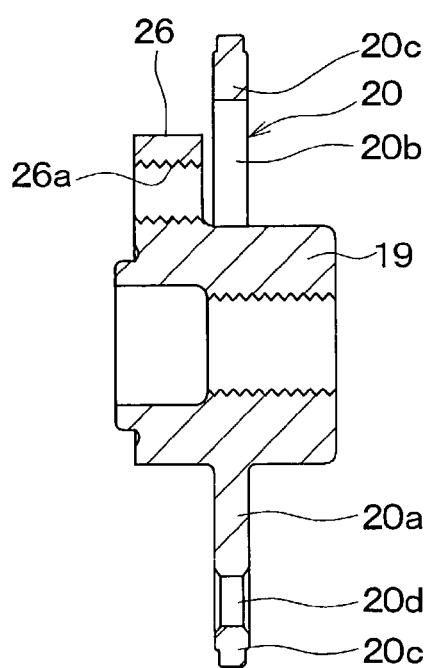
FIG. 20 is a cross sectional view of FIG. 19.
Figure 21:
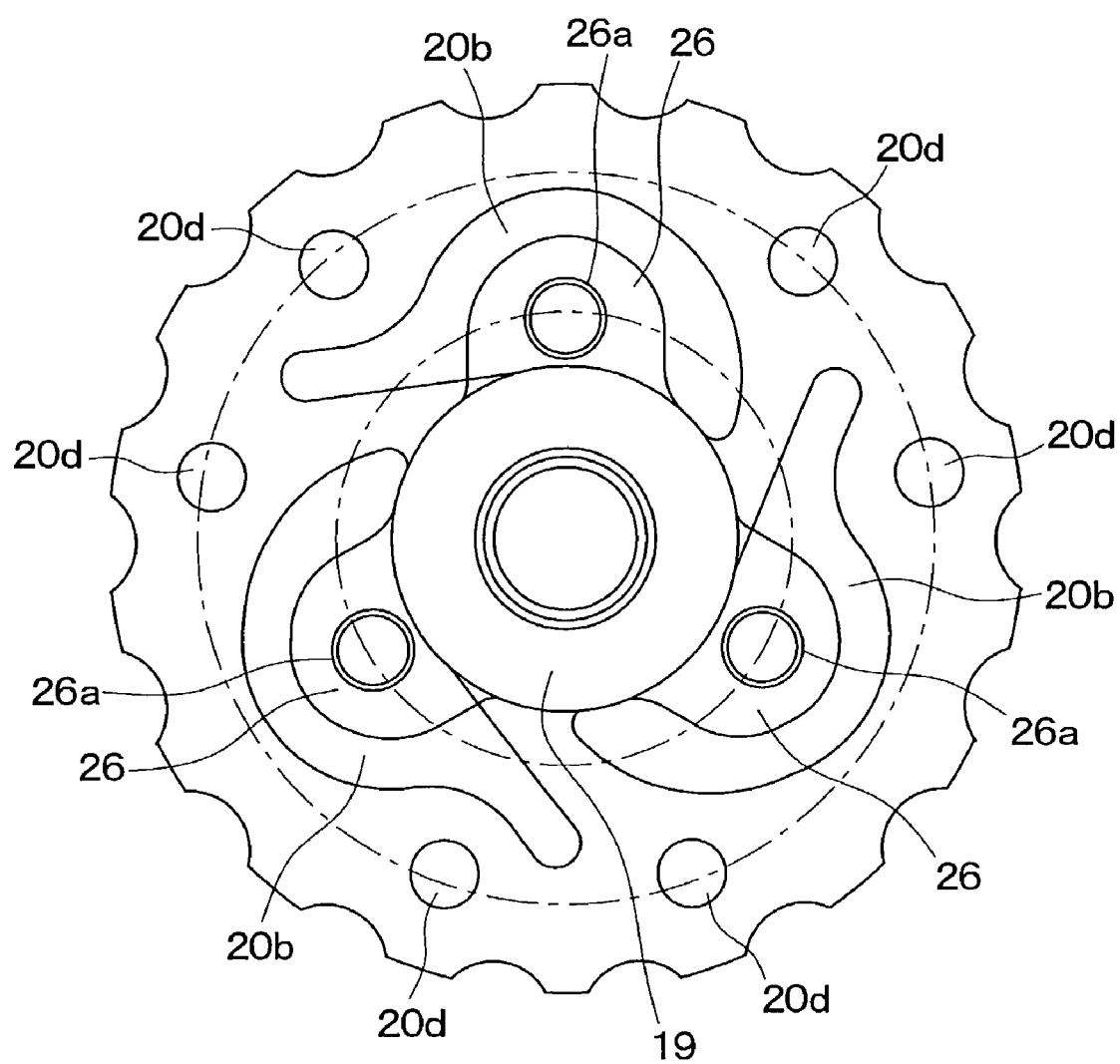
FIG. 21 is a right side view of the inner cylindrical member of the hub member according to the fourth embodiment.

Thus, in the fourth embodiment, a plurality of securing portions 26 is integrally formed in the outer peripheral surface of the inner cylindrical member 19 of the hub member 18, and each securing portion 26 includes a female threaded portion 26*a*, into which the corresponding bolt 25 is threadably tightened. As shown in FIGS. 19 to 21, each securing portion 26 is positioned between the two corresponding bridges 20*a* of the torque limiter 20 in a circumferential direction of the inner cylindrical member 19. In other words, each securing portion 26 is located at a corresponding position, at which the corresponding hole 20*b* is formed, and is also located on a side of the torque limiter 20 opposite to the compressor 15 in the axial direction of the inner cylindrical member 19. Each securing portion 26 has a generally arcuate shape. The securing portions 26 radially outwardly project from the outer peripheral surface of the inner cylindrical member 19 at three points.

Figure 18:
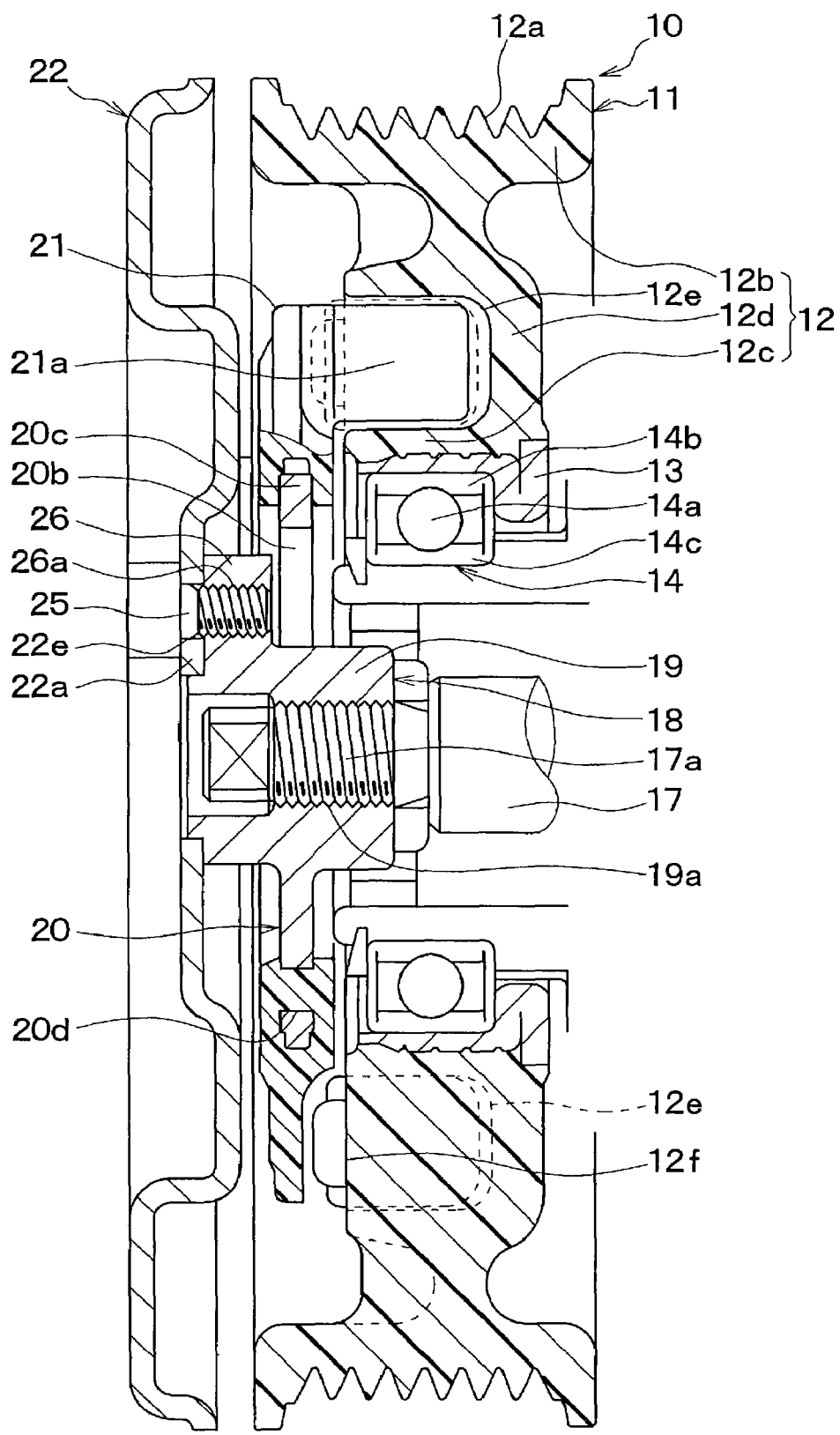
FIG. 18 is a cross sectional view of FIG. 17.

As shown in FIG. 18, unlike the cylindrical inner peripheral section 22*a* of the weight member 22 disclosed in each of the first to third embodiments, the inner peripheral section 22*a* of the weight member 22 is shaped as a plate that extends in the radial direction. A plurality of bolt receiving through holes 22*e* (FIG. 18), each of which receives the corresponding bolt 25, is formed at a plurality of points (in the present exemplary case, the number of the points is three), which are aligned with the female threaded portions 26*a* of the inner cylindrical member 19, in the plate shaped inner peripheral section 22*a*.

Each bolt 25 is inserted into the corresponding receiving through hole 22*e* and is threadably tightened into the corresponding female threaded portion 26*a* of the inner cylindrical member 19, so that the inner peripheral section 22*a* of the weight member 22 is threadably secured to the inner cylindrical member 19.

In each of the second to fourth embodiments, the inner peripheral section 22*a* of the weight member 22 is secured to the inner cylindrical member 19 of the hub member 18, so that the weight member 22 can be secured to the hub member 18 at the point that is closer to the rotatable shaft 17 than the torque limiter 20. Thus, similar to the first embodiment, the load, which is induced by the vibrations of the weight member 22, is not applied to the torque limiter 20, so that the erroneous activation of the torque limiter 20 can be avoided.

(Other Embodiments)

In each of the above embodiments, the torque limiter 20 is integrally formed in the radially outer section of the inner cylindrical member 19 of the hub member 18. However, the torque limiter 20 can be provided separately from the inner cylindrical member 19 of the hub member 18, and the torque limiter 20 can be positioned between the inner cylindrical member 19 of the hub member 18 and the outer annular body 21.

Furthermore, in each of the above embodiments, the resilient damper mechanism includes the pairs of resilient damper members 23, 24 (each pair includes one resilient damper member 23 and one resilient damper member 24), which are made of the resiliently deformable material and are positioned between the pulley 11 and the outer annular body 21 of the hub member 18. However, the damper mechanism is not limited to this arrangement. The positions of the resilient damper members can be modified in any appropriate way. Furthermore, the material of the resilient damper members is not limited to the above-described rubber (EPDM) and can be any other appropriate resilient resin, such as elastomer.

Furthermore, in each of the above embodiments, the torque transmission device is applied to the vehicle air conditioning system. However, the present invention is not limited to this and can be applied to any other torque transmission devices of any fields.

Additional advantages and modifications will readily occur to those skilled in the art. The invention in its broader terms is therefore, not limited to the specific details, representative apparatus, and illustrative examples shown and described.

What is claimed is:

1. A torque transmission device, which transmits torque from a drive source to a rotating device, the torque transmission device comprising:
    a first rotator, which receives the torque transmitted from the drive source and is rotated by the torque;
    a second rotator, which is connected to a rotatable element of the rotating device and is rotated integrally with the rotatable element;
    a torque limiter, which is arranged in a torque transmission path between the first rotator and the second rotator, wherein the torque limiter transmits torque, which is transmitted from the drive source to the first rotator, to the second rotator, and wherein the torque limiter disables the transmission of the torque from the first rotator to the second rotator when the transmitted torque, which is transmitted from the first rotator to the torque limiter, becomes equal to or greater than a predetermined value; and
    a weight member, which is secured to the second rotator and serves as an inertia mass, which generates inertia that limits torque fluctuations of the rotating device, wherein the weight member is secured to the second rotator at a point that is radially inward of the torque limiter, and an outer peripheral edge of the weight member is located radially outward of the torque limiter.

2. A torque transmission device according to claim 1, wherein the second rotator is connected to the rotatable element of the rotating device;
   an inner peripheral section of the weight member is secured to the second rotator; and
   the torque limiter is arranged radially outward of the second rotator.

3. A torque transmission device according to claim 2, wherein the torque limiter is integrally formed with the second rotator and is destroyed when the transmitted torque, which is transmitted from the first rotator to the torque limiter, becomes equal to or greater than the predetermined value.

4. A torque transmission device according to claim 2, wherein the inner peripheral section of the weight member is securely press fitted over an outer peripheral surface of the second rotator.

5. A torque transmission device according to claim 4, wherein the outer peripheral surface of the second rotator is polygonal.

6. A torque transmission device according to claim 2, wherein:
   an outer peripheral surface of the second rotator includes a cylindrical male threaded portion;
   the inner peripheral section of the weight member includes a female threaded portion; and
   the female threaded portion of the inner peripheral section of the weight member is threadably securely engaged with the male threaded portion of the outer peripheral surface of the second rotator.

7. A torque transmission device according to claim 6, wherein the inner peripheral section of the weight member is also secured to the outer peripheral surface of the second rotator by at least one deformed portion of the inner peripheral section of the weight member, wherein the at least one deformed portion of the second rotator is deformed and is biased against the outer peripheral surface of the second rotator.

8. A torque transmission device according to claim 7, wherein the outer peripheral surface of the second rotator includes at least one recess, wherein each of the at least one deformed portion of the inner peripheral section of the weight member is received into and is biased against a corresponding one of the at least one recess of the outer peripheral surface of the second rotator.

9. A torque transmission device according to claim 1, further comprising at least one bolt, wherein:
   the second rotator includes at least one female threaded portion;
   an inner peripheral section of the weight member includes at least one bolt receiving through hole, which penetrates through the inner peripheral section of the weight member; and
   each of the at least one bolt is received through a corresponding one of the at least one bolt receiving through hole of the inner peripheral section of the weight member and is threadably tightened into a corresponding one of the at least one female threaded portion of the second rotator, so that the inner peripheral section of the weight member is secured to the second rotator.

10. A torque transmission device according to claim 1, wherein the weight member includes at least one jig receiving hole, into which a tightening jig is received to apply tightening force to the weight member and to threadably secure the second rotator together with the weight member to the rotatable element of the rotating device.

11. A torque transmission device according to claim 1, further comprising at least one resilient damper member, which is arranged between the first rotator and the torque limiter, wherein the at least one resilient damper member transmits the torque from the first rotator to the torque limiter and reduces fluctuations in the transmitted torque, which is transmitted from the first rotator to the torque limiter.

12. A torque transmission device according to claim 1, wherein the weight member is axially spaced from the torque limiter.

13. A torque transmission device according to claim 12, wherein a radial extent of the weight member is substantially the same as that of the first rotator.

14. A torque transmission device according to claim 12, wherein the torque limiter is axially arranged between the first rotator and the weight member.

15. A torque transmission device according to claim 1, wherein:
   the drive source is an engine of a vehicle;
   the rotating device is a compressor of an air conditioning system of the vehicle; and
   the rotatable element is a rotatable shaft of the compressor.

16. A torque transmission device according to claim 15, wherein the first rotator is a pulley, which is connected to the engine through a belt.

17. A torque transmission device, which transmits torque from a drive source to a rotating device, the torque transmission device comprising:
   a first rotator, which receives the torque transmitted from the drive source and is rotated by the torque;
   a second rotator, which is connected to a rotatable element of the rotating device and is rotated integrally with the rotatable element;
   a torque limiter, which is arranged in a torque transmission path between the first rotator and the second rotator, wherein the torque limiter transmits torque, which is transmitted from the drive source to the first rotator, to the second rotator, and wherein the torque limiter disables the transmission of the torque from the first rotator to the second rotator when the transmitted torque, which is transmitted from the first rotator to the torque limiter, becomes equal to or greater than a predetermined value; and
   a weight member, which is secured to the second rotator and serves as an inertia mass, wherein:
   the weight member is secured to the second rotator at a point that is radially inward of the torque limiter;
   an outer peripheral edge of the weight member is located radially outward of the torque limiter;
   the second rotator is connected to the rotatable element of the rotating device;
   an inner peripheral section of the weight member is secured to the second rotator;
   the torque limiter is arranged radially outward of the second rotator; and
   the torque limiter is integrally formed with the second rotator and is destroyed when the transmitted torque, which is transmitted from the first rotator to the torque limiter, becomes equal to or greater than the predetermined value.

18. A torque transmission device, which transmits torque from a drive source to a rotating device, the torque transmission device comprising:

a first rotator, which receives the torque transmitted from the drive source and is rotated by the torque;

a second rotator, which is connected to a rotatable element of the rotating device and is rotated integrally with the rotatable element;

a torque limiter, which is arranged in a torque transmission path between the first rotator and the second rotator, wherein the torque limiter transmits torque, which is transmitted from the drive source to the first rotator, to the second rotator, and wherein the torque limiter disables the transmission of the torque from the first rotator to the second rotator when the transmitted torque, which is transmitted from the first rotator to the torque limiter, becomes equal to or greater than a predetermined value;

a weight member, which is secured to the second rotator and serves as an inertia mass, wherein the weight member is secured to the second rotator at a point that is radially inward of the torque limiter, and an outer peripheral edge of the weight member is located radially outward of the torque limiter; and at least one resilient damper member, which is arranged between the first rotator and the torque limiter, wherein the at least one resilient damper member transmits the torque from the first rotator to the torque limiter and reduces fluctuations in the transmitted torque, which is transmitted from the first rotator to the torque limiter.

* * * * *